United States Patent [19]
Thibault et al.

[11] Patent Number: 6,061,274
[45] Date of Patent: May 9, 2000

[54] METHODS AND APPARATUS FOR MESSAGE TRANSFER IN COMPUTER STORAGE SYSTEM

[75] Inventors: Robert A. Thibault, Raynham; Michael Shulman, Groton, both of Mass.

[73] Assignee: EMC Corporation, Hopkinton, Mass.

[21] Appl. No.: 09/224,701

[22] Filed: Jan. 4, 1999

[51] Int. Cl.⁷ ........................................................ G11C 7/00
[52] U.S. Cl. ........................................ 365/189.05; 365/241
[58] Field of Search ........................ 365/189.01, 189.02, 365/189.04, 189.05, 241, 230.02, 230.03

[56] References Cited

U.S. PATENT DOCUMENTS 5,119,240  6/1992  Raymond ............................ 365/230.03

Primary Examiner—Terrell W. Fears
Attorney, Agent, or Firm—Wolf, Greenfield & Sacks, P.C.

[57] ABSTRACT

A computer storage system includes an array of storage devices, a system cache memory, one or more back end directors for controlling data transfer between the storage devices and the system cache memory, and one or more front end directors for controlling data transfer between the system cache memory and a host computer. Each director includes a processor and a message interface for controlling high speed message transfer between the processors in the directors. The message interfaces in the directors may be interconnected in a closed-loop configuration. Each message interface may include a transmit/receive circuit for transferring messages to and from other directors, a message memory for storing outgoing messages and incoming messages, and a message controller for controlling transfer of messages between the processor and the message memory and between the message memory and the transmit/receive circuit.

18 Claims, 7 Drawing Sheets

METHODS AND APPARATUS FOR MESSAGE TRANSFER IN COMPUTER STORAGE SYSTEM

FIELD OF THE INVENTION

This invention relates to computer storage systems and, more particularly, to methods and apparatus for transferring messages between directors in disk array systems.

BACKGROUND OF THE INVENTION

Computer storage systems for high capacity, on-line applications are well known. Such systems use arrays of disk devices to provide a large storage capacity. To alleviate the delays inherent in accessing information in the disk array, a large capacity system cache memory is typically utilized. Controllers known as back end directors or disk adaptors control transfer of data from the system cache memory to the disk array and from the disk array to the system cache memory. Each back end director may control several disk devices, each typically comprising a hard disk drive. Controllers known as front end directors or host adaptors control transfer of data from the system cache memory to a host computer and from the host computer to the system cache memory. A system may include one or more front end directors and one or more back end directors.

The front end directors and the back end directors perform all functions associated with transfer of data between the host computer and the system cache memory and between the system cache memory and the disk array. The directors control cache read operations and execute replacement algorithms for replacing cache data in the event of a cache miss. The directors control writing of data from the cache to the disk array and may execute a prefetch algorithm for transferring data from the disk devices to the system cache memory in response to sequential data access patterns. The directors also execute diagnostic and maintenance routines. In general, the directors incorporate a high degree of intelligence.

During the operation of the computer storage system, it is frequently necessary to send messages between directors. For example, it may be necessary to transmit locking messages to other directors when a data block is being modified. In another example, a director may notify other directors of a hardware fault, so that appropriate steps may be taken. The mechanism used to transmit messages between directors is required to have low latency, because the receiving director may be required to act quickly or the transmitting director may require a quick response.

Prior art disk array systems have incorporated mechanisms for transferring messages between directors. In one prior art approach, a portion of the system cache memory functions as a mailbox for message transfer. A transmitting director writes a message in the mailbox section of system cache memory, and the receiving director reads the message. The messages are sent to and from system cache memory on the main data bus that is used for transfer of data between the system cache memory and the host computer or between the system cache memory and the disk array. This approach has disadvantages. First, the system cache memory and the buses connected to it are optimized for high data throughput rather than low latency. Accordingly, message transfer through the system cache memory may not provide sufficiently low latency. Furthermore, since messages are given priority over data transfers, data transfer performance is degraded as message traffic increases.

Another prior art approach to message transfer between directors involves an Ethernet local area network (LAN) that interconnects directors and is typically used for diagnostics, downloading of software, and the like. The LAN does not provide an acceptable level of latency in the transfer of messages and does not have inherent fault tolerant features to ensure data integrity. Accordingly, there is a need for improved methods and apparatus for message transfer in disk array systems.

SUMMARY OF THE INVENTION

According to a first aspect of the invention, a computer storage system is provided. The computer storage system comprises an array of storage devices, a system cache memory, one or more back end directors for controlling data transfer between the storage devices and the system cache memory, and one or more front end directors for controlling data transfer between the system cache memory and a host computer. At least two of the directors comprise a processor for controlling data transfer and a message interface for controlling high speed message transfer between the processors in the directors.

The message interface in each of the directors may comprise first and second ports for serial data transfer to other directors. Each of the first and second ports may be connected to another director to form a closed-loop network configuration. The message interface in each of the directors preferably utilizes the SSA interface protocol.

The message interface in each of the directors may comprise a transmit/receive circuit for transferring messages to and from other directors, a message memory for storing outgoing messages and incoming messages, and a message controller for controlling transfer of messages between the processor and message memory and between the message memory and the transmit/receive circuit.

In one embodiment, each director comprises a first processor and a second processor that share the message interface. An area of the message memory may be assigned to each of the first and second processors. Each processor area may include a message area for storing incoming and outgoing messages and a communication area for communication between the respective processor and the transmit/receive circuit.

Each processor may include means for writing an outgoing message in the message memory and means for notifying the message controller that the outgoing message has been written in the message memory. The message controller may include means for writing an incoming message in the message memory and means for notifying the respective processor that the incoming message has been written in the message memory.

According to another aspect of the invention, a method is provided for transferring messages between directors in a computer storage system. The computer storage system comprises an array of storage devices, a system cache memory, one or more back end directors for controlling data transfer between the array and the system cache memory, and one or more front end directors for controlling data transfer between the system cache memory and a host computer. Messages are transferred from a transmitting director to a receiving director on a high speed serial data link. As a result, the long latencies inherent in prior art message transfer techniques are overcome.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
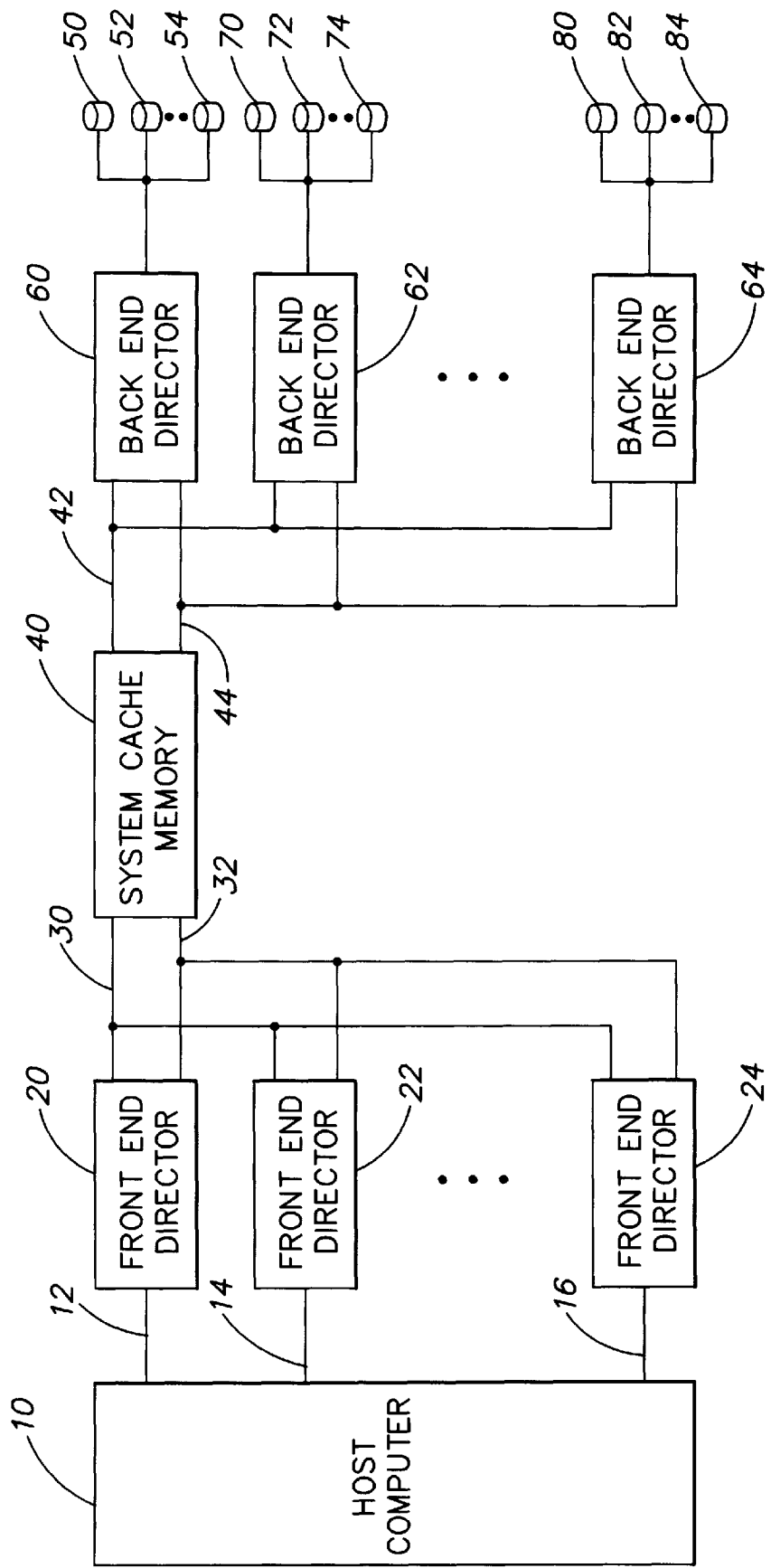
FIG. 1 is a block diagram of a computer storage system suitable for incorporation of the invention.

An example of a computer storage system suitable for incorporation of the present invention is shown in FIG. 1. A host computer 10 may be connected to the storage system using one or more channels or buses 12, 14, . . . 16. The channels for communication with host computer 10 can be any suitable connection, such as a small computer system interface (SCSI), enterprise systems connection architecture (ESCON) or fiber channel (FC).

The storage system includes one or more front end directors 20, 22, . . . 24, which are responsible for managing and translating read and write requests from host computer 10 into one or more requests corresponding to how data is stored on physical disk drives in the storage system. The front end directors 20, 22, . . . 24 are connected via buses 30 and 32 to a system cache memory 40. The system cache memory 40 may be a random access memory having greater speed than the disk drives. If data being read is temporarily stored in the cache, a read request can be fulfilled more quickly by taking the data from system cache memory 40. Similarly, when writing data, the data to be written can be stored in system cache memory 40. System operation can proceed, while data is written from the system cache memory to the appropriate disk drive. The front end directors 20, 22, . . . 24 can be implemented in a number of ways, including a general purpose processor or a custom hardware implementation.

System cache memory 40 is coupled to disk drives 50, 52, . . . 54 through a back end director 60. The storage system may include one or more back end directors, each connected to one or more disk drives. In the example of FIG. 1, system cache memory 40 is coupled to disk drives 70, 72, . . . 74 through a back end director 62 and is coupled to disk drives 80, 82, . . . 84 through a back end director 64. Each back end director 60, 62, . . . 64 may be implemented using a general purpose processor or a custom hardware implementation. Each back end director 60, 62, . . . 64 is connected to system cache memory 40 via buses 42 and 44. Each of the buses 30, 32, 42 and 44 may be implemented, for example, as a 72 bit parallel bus. The system cache memory 40 may be a dual port random access memory. In one example, each back end director 60, 62, . . . 64 controls 4 disk drives, and the system may include up to 256 disk drives. An example of a computer storage system having the general configuration shown in FIG. 1 and described above is the Symmetrix model 5700, manufactured and sold by EMC Corporation.

Figure 2:
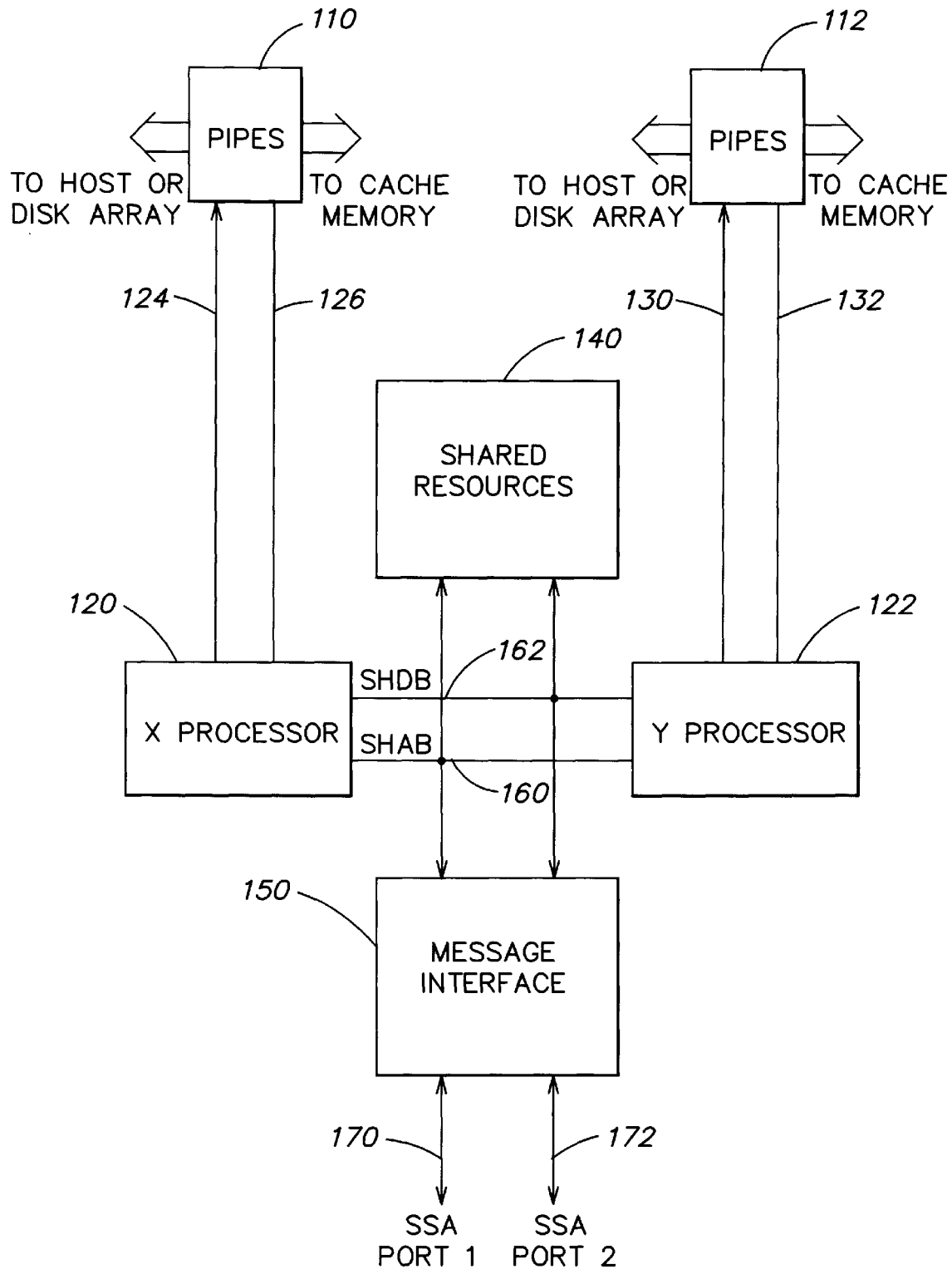
FIG. 2 is a simplified block diagram of a director.

A block diagram of an example of a suitable director architecture is shown in FIG. 2. In one embodiment, the same architecture may be used for front end directors 20, 22, . . . 24 and back end directors 60, 62, . . . 64. The director includes pipes 110 and 112, each of which constitutes a high speed data path between the host computer 10 and system cache memory 40 in the case of a front end director or a high speed data path between the disk array and the system cache memory 40 in the case of a back end director. Pipes 110 and 112 are respectively connected to data buses 30 and 32 or to data buses 42 and 44. Pipes 110 and 112 contain data transfer circuitry, the details of which are outside the scope of the present invention.

Pipes 110 are controlled by an X processor 120, and pipes 112 are controlled by a Y processor 122. The dual processor configuration provides high throughput and high efficiency in the operation of the computer memory system. The processors 120 and 122 include private resources required for high performance operation, such as local cache memory, a main memory, control circuitry and registers. X processor 120 is coupled to pipes 110 by a private address bus 124 and a private data bus 126. Y processor 122 is coupled to pipes 112 by a private address bus 130 and a private data bus 132.

The director also includes shared resources 140 and a message interface 150. Processors 120 and 122, shared resources 140 and message interface 150 are interconnected by a shared address bus 160 and a shared data bus 162. Shared resources 140 includes those resources which are not critical to the performance of processors 120 and 122. Shared resources 140 may include a variety of control functions, such as nonvolatile storage of software execution logs and error logs, and nonvolatile storage of software for processors 120 and 122, and one or more connections to a local area network for diagnostic and maintenance purposes.

Message interface 150 is shared by processors 120 and 122 and provides a mechanism for high speed message transfer among directors. Messages may be transferred among front end directors, among back end directors and among front end and back end directors. A message is transferred from a source director to one or more destination directors. In the example of FIG. 2, message interface 150 utilizes the SSA message protocol defined by ANSI document X3T10.1/0989D, "SSA Transport Layer One". Message interface 150 includes a first SSA port 170 and a second SSA port 172. Each port 170, 172 provides bidirectional serial data transmission. Furthermore, the message interface 150 may be utilized for message transfer between processors on a single director. Thus for example, a message may be transferred from X processor 120 to Y processor 122 via message interface 150, not using the SSA protocol or ports 170 and 172.

Figure 3:
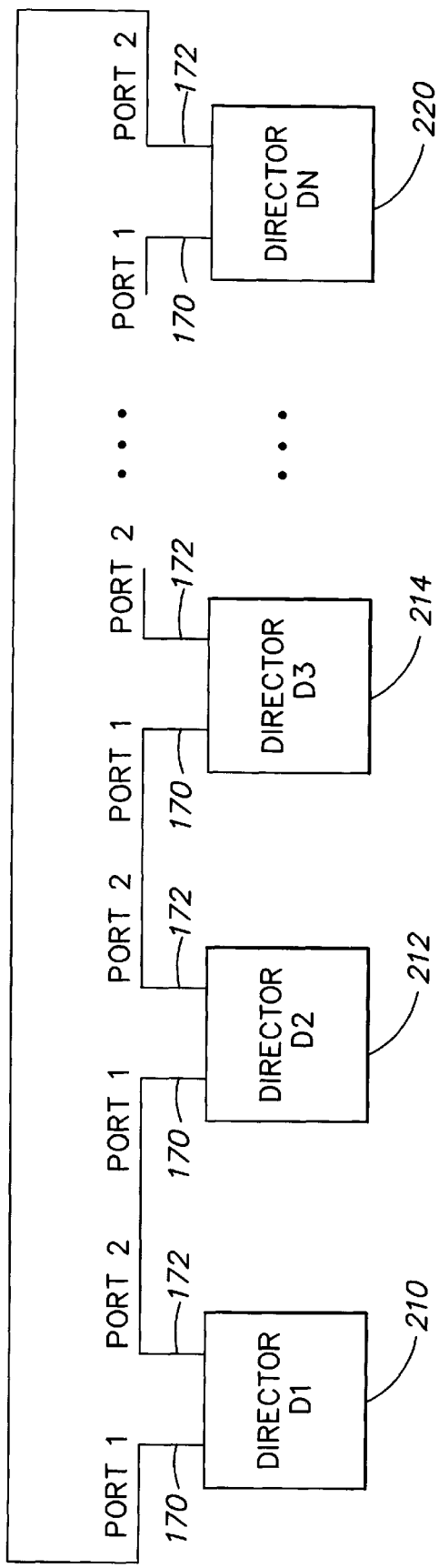
FIG. 3 is a block diagram showing the interconnection of front end directors and back end directors for message transfer in accordance with the invention.

A block diagram showing an interconnection between directors for message transfer in accordance with the invention is shown in FIG. 3. In the example of FIG. 3, the computer storage system includes N directors 210, 212, 214, . . . 220, each of which may be a front end director or a back end director. A complete computer storage system requires at least one front end director and one back end director. Each director includes two SSA ports 170 and 172 and is connected to two logical neighbor directors in a closed-loop configuration. Thus, port 2 of director 210 is connected to port 1 of director 212, and port 2 of director 212 is connected to port 1 of director 214. Port 2 of director 220 is connected to port 1 of director 210, thereby forming a closed-loop configuration. The closed-loop configuration provides redundancy in the operation of the message transfer system. Thus, for example, if the connection between port 2 of director 210 and port 1 of director 212 is broken, a message may be transmitted from port 1 of director 210 to port 2 of director 212. The transmission of messages is described in more detail below.

Figure 4:
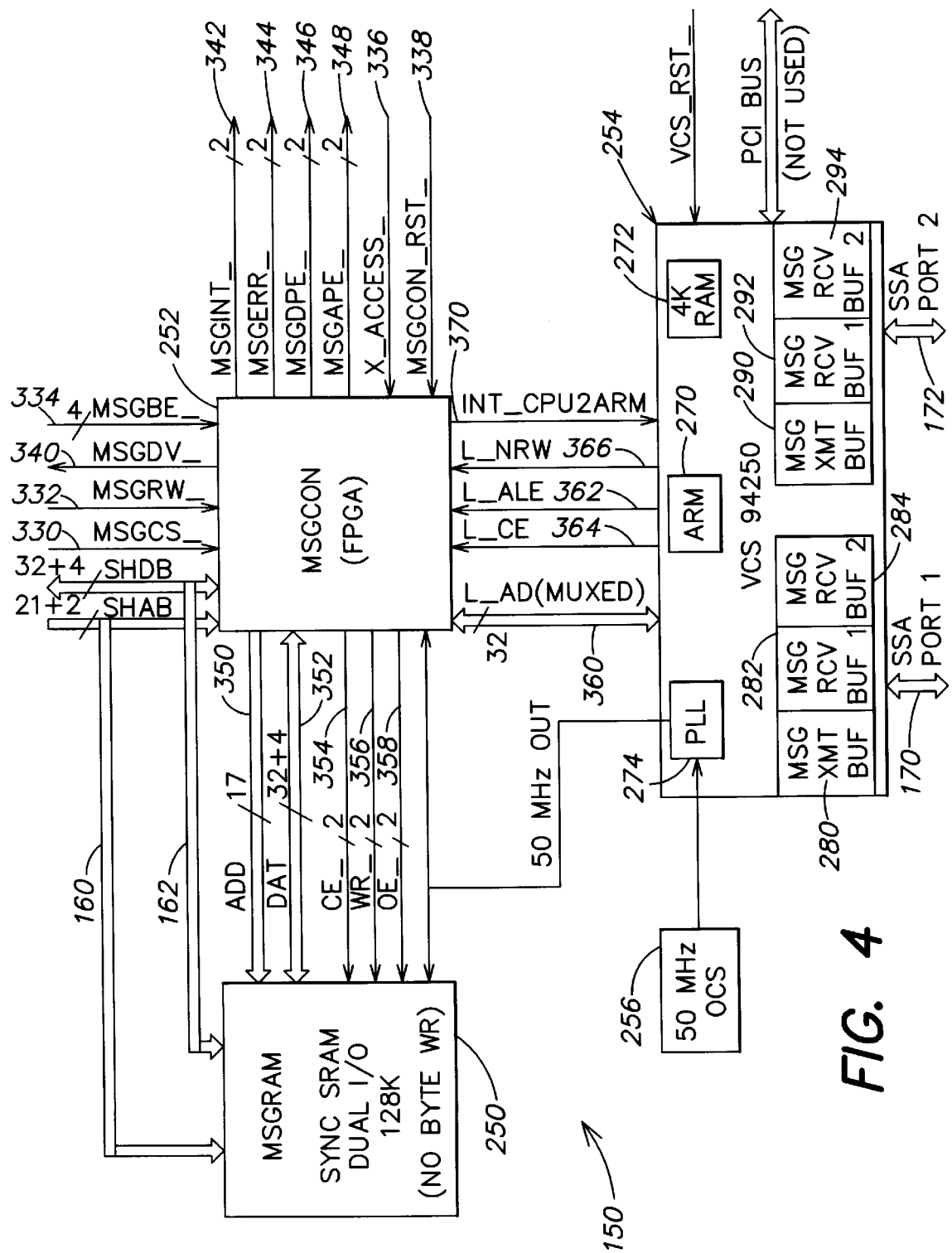
FIG. 4 is a block diagram of an embodiment of the message interface shown in FIG. 2.

A block diagram of an example of message interface 150 is shown in FIG. 4. Message interface 150 includes a message memory 250, a message controller 252, an SSA transmit/receive circuit 254 and an oscillator 256. In the example of FIG. 4, message memory 250 is a dual port random access memory (RAM) and may comprise a synchronous SRAM having a capacity of 128k bytes. The dual port feature permits separate access by the processors 120 and 122 (FIG. 2) and the transmit/receive circuit 254. Access to memory 250 is controlled through message controller 252.

Transmit/receive circuit 254 may include an Advanced Risc Machine (ARM) processor core 270, a memory 272, such as a 4k RAM, and a phase locked loop 274. Phase locked loop 274 receives the output of oscillator 256, typically at 50 MHz, and provides a 50 MHz output signal, synchronized to the device's external memory bus, to message memory 250 and message controller 252. In addition, transmit/receive circuit 254 may include a transmit buffer 280 and receive buffers 282 and 284 associated with port 170, and a transmit buffer 290 and receive buffers 292 and 294 associated with port 172.

Message interface 150 operates generally as follows. For transmission of messages, one of the processors 120 or 122 (FIG. 2) writes an outgoing message to message memory 250. The transmit/receive circuit 254 reads the outgoing message from the message memory 250, converts the message to serial format and transmits the message on one of the ports 170 and 172. When the message interface 150 receives a message, the message is examined to determine if it is addressed to that director or to a different director. When the message is addressed to another director, the message is transmitted through the other port to the next director in the closed-loop configuration. When the message is addressed to that director, the message is written to the message memory 250, and the appropriate processor is interrupted. The processor then reads the message from message memory 250. Transmission and reception of messages is described in more detail below.

Figure 5:
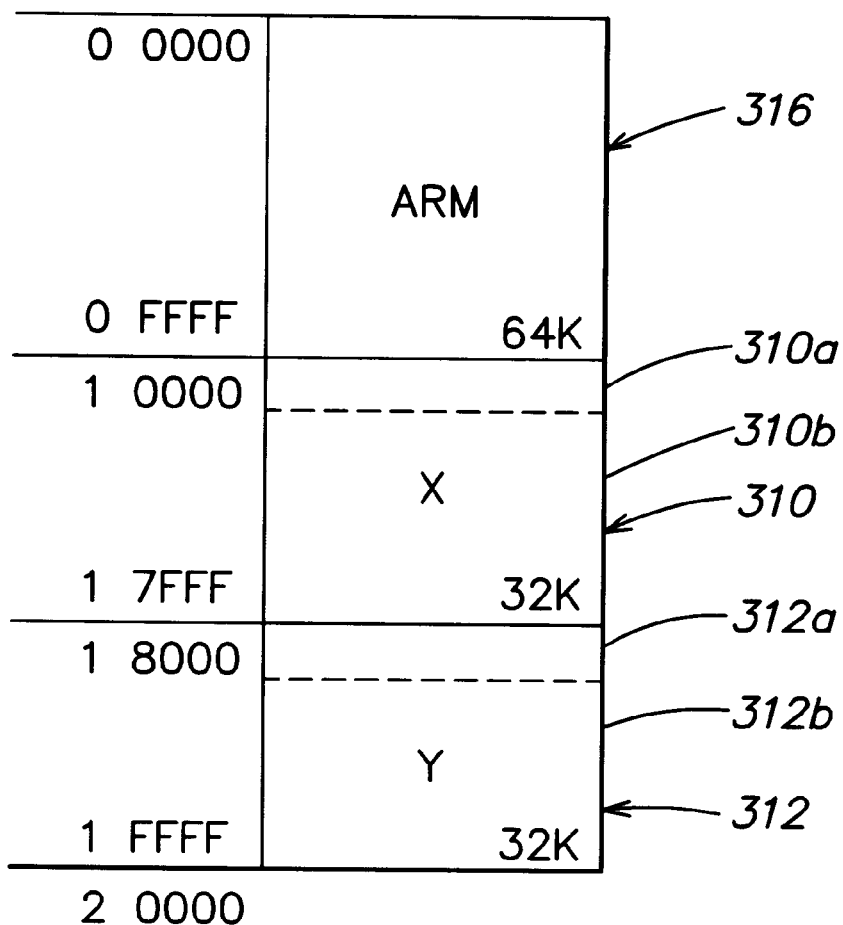
FIG. 5 is a schematic diagram that illustrates an example of the organization of the message memory shown in FIG. 4.

A suitable organization of message memory 250 is shown in FIG. 5 for the example where the message memory 250 has a capacity of 128k bytes. Message memory 250 includes an X area 310 and a Y area 312, which are dedicated to the X processor 120 and the Y processor 122, respectively. Message memory 250 may also include an ARM area 316 which provides additional memory for ARM processor 270 in transmit/receive circuit 254 (FIG. 4). The areas 310 and 312 dedicated to the respective processors 120 and 122 may each be subdivided into a communication area 310a, 312a and a message area 310b, 312b. The message areas 310b and 312b may contain the data of messages being transmitted or received. The communication areas 310a and 312a permit communication between the respective processors and the ARM processor 270. Examples of information that may be placed in the communication areas 310a and 312a include destination identifiers of messages being transmitted, counts of messages in transmit and receive queues in the respective message areas 310b and 312b, and status information. In the example of FIG. 5, X and Y areas 310 and 312 have capacities of 32K bytes each, and ARM area 316 has a capacity 64K bytes. The message controller 252 may include write protect registers which ensure that X processor 120 accesses only X area 310 of message memory 250 and that Y processor 122 accesses only Y area 312.

As shown in FIG. 4, shared address bus 160 and shared data bus 162 are connected to message memory 250 and to message controller 252. As indicated above, shared address bus 160 and shared data bus 162 are connected to each of the processors 120 and 122 in the director. The processors provide control signals to the message controller 252, including a chip select signal 330 to select the message memory 250 or a register in the message controller 252, a read/write signal 332 to specify read or write, and a four-bit message byte enable signal 334 to enable a selected byte in the message. In addition, an X access signal 336 identifies the processor that is reading or writing a message, and a reset signal 338 resets the message controller.

Message controller 252 supplies signals to the respective processors 120 and 122, including a data valid signal 340, a message interrupt signal 342, a message error signal 344, a data parity error 346 and an address parity error 348. The message interrupt signal 342 and the error signals 344, 346 and 348 have two lines each, one corresponding to each of the processors 120 and 122. The message error signal 344 is reserved for errors other than parity errors. For example, the message error signal 344 may be used to indicate that one of the processors attempted to access an area of message memory 250 other than its assigned area.

Connections between message controller 252 and message memory 250 include an address bus 350 and a data bus 352. Shared address bus 160 and shared data bus 162 are connected to one port of message memory 250, and address bus 350 and data bus 352 are connected to the other port of message memory 250. Message controller 252 also provides control signals, including a chip enable signal 354, a write enable signal 356 and an output enable signal 358, to message memory 250. One control signal is provided for each of the two ports.

The connections between message controller 250 and transmit/receive circuit 354 include a multiplexed bus 360 which carries both address and data at different times. An address/data signal 362 indicates whether an address or data is present on bus 360. The transmit/receive circuit 254 also provides a chip enable signal 364 and a read/write signal 366 to message controller 252. Message controller 252 supplies an interrupt signal 370 to transmit/receive circuit 254 to indicate that a message has been written in message memory 250 and is awaiting transmission.

Figure 6:
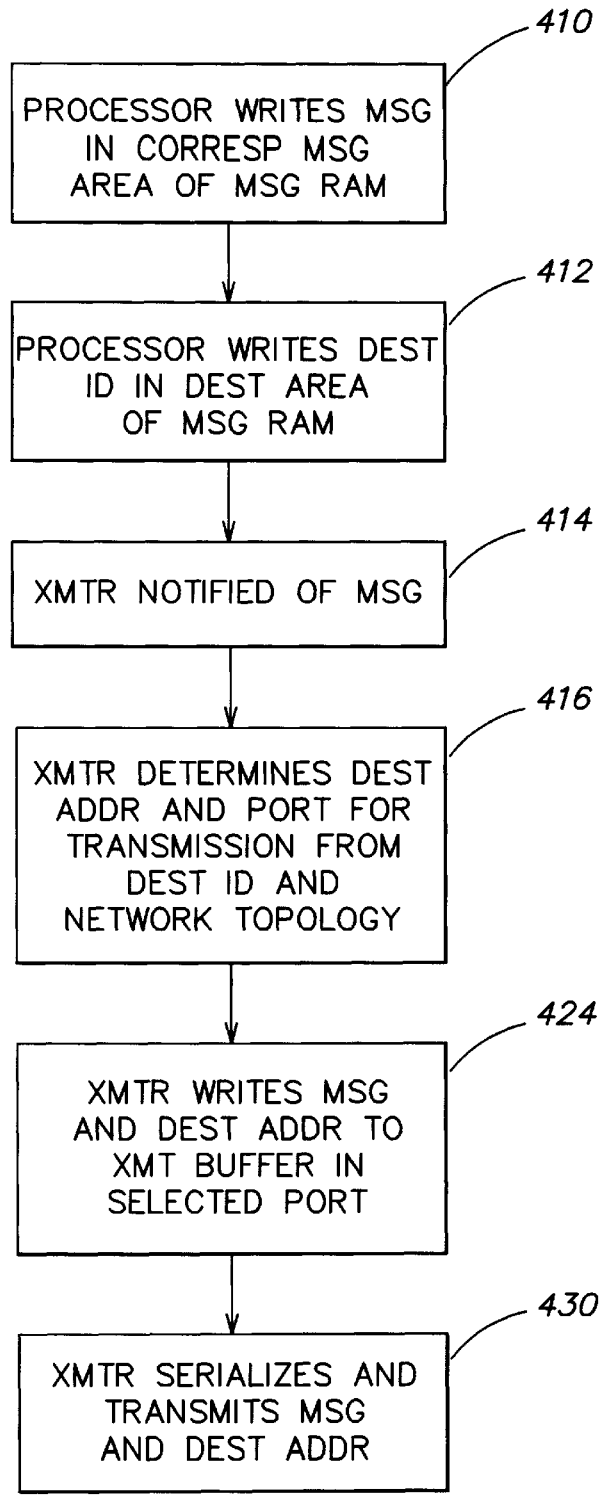
FIG. 6 is a flow chart that illustrates an example of a routine for transmitting messages in accordance with the invention.

A flow chart that illustrates an example of a process for transmission of a message by one of the directors is shown in FIG. 6. In step 410, one of the processors 120 or 122 having a message to be transmitted writes the message in the corresponding area of message memory 250. Thus, assuming that Y processor 122 is transmitting a message, the message is written in message area 312b of Y area 312 (FIG. 5) in message memory 250. The processor places the address on shared address bus 160 and the message on shared data bus 162, and supplies a chip select signal 330 to message controller 252. Message controller 252 supplies a chip enable signal 354 and a write enable signal 356 to the appropriate port of message memory 250. This process transfers four bytes and is repeated until the entire message is transferred. The message may, for example, have a length of 32 bytes.

In step 412, the transmitting processor writes a message destination identifier (ID) in a destination area of message memory 250. The destination area may be in the communication area of message memory 250 that corresponds to the transmitting processor.

In step 414, the transmitter in transmit/receive circuit 254 is notified of the message that was written to message memory 250. In one approach, the communication area of message memory 250 for each processor has memory locations that contain a transmit queue and a receive queue. A value in the transmit queue may be incremented each time a message is written in memory by the corresponding processor and may be decremented when a message is transmitted. Similarly, a value in the receive queue may be incremented each time a received message is written in memory by the ARM processor 270 and may be decremented when a message is read by the corresponding processor. The transmit/receive circuit 254 may poll each transmit queue at specified intervals to determine whether there are messages waiting to be transmitted. A non-zero value in the transmit queue indicates messages waiting to be transmitted. In another approach, the message controller 252 may interrupt the transmit/receive circuit 254 to indicate that a message is awaiting transmission.

It will be understood that the ARM processor 270 in transmit/receive circuit 254 is programmed to perform both transmit and receive operations. The transmit/receive circuit is referred to as a transmitter when messages are being transmitted and is referred to as a receiver when messages are being received.

In step 416, the transmitter in transmit/receive circuit 254 determines a destination address and a port for transmission of the message. The destination address and the port are determined from the destination ID and from knowledge of the network topology. The network topology specifies the location of each director in the message network. The network topology may, for example, be embodied in a table which associates each destination ID with a port that provides the shortest path to the destination ID and a destination address that corresponds to the destination ID. The destination address is a number representative of the number of nodes between the message transmitter and the message destination.

In step 424, the transmitter writes the message from the message memory 250 to the transmit buffer in the selected port. When, for example, the message is transmitted through port 170, the message and the destination address are placed in transmit buffer 280. The transmit/receive circuit 254 communicates with message memory 250 via message controller 252. In particular, transmit/receive circuit 254 requests writing of the message by asserting chip enable signal 364 to message controller 252. Message controller 252 provides addresses on address bus 350, chip enable signal 354 and output enable signal 358 to message memory 250. The message is transferred via data bus 352 and multiplexed bus 360 to transmit buffer 280.

In step 430, the transmitter serializes and transmits the destination address and the message to the director connected to port 170 in accordance with the SSA protocol or other suitable serial data protocol. The message may be transmitted in a data packet that includes a header, a message body of up to 32 bytes and a trailer. The destination address may be part of the header.

The message transmission process shown in FIG. 6 and described above may be illustrated by way of example. With reference to FIG. 3, assume that the Y processor in director 212 requires transmission of a message to the X processor 120 in director 220. The Y processor in director 212 writes a destination ID, such as "220X", in the destination area of message memory 250. The destination ID is used by the ARM processor 270 to access the table that contains the port and destination address of the X processor in director 220. The shortest path from director 212 to director 220 is from port 1 of director 212 through director 210 to port 2 of director 220. The table entry in director 212 which corresponds to director 220 thus specifies port 1 for transmission. The corresponding destination address has a value of 1 because there is one node between director 212 and director 220. The message is thus transmitted by director 212 through port 1 with a destination address having a value of 1.

Figure 7:
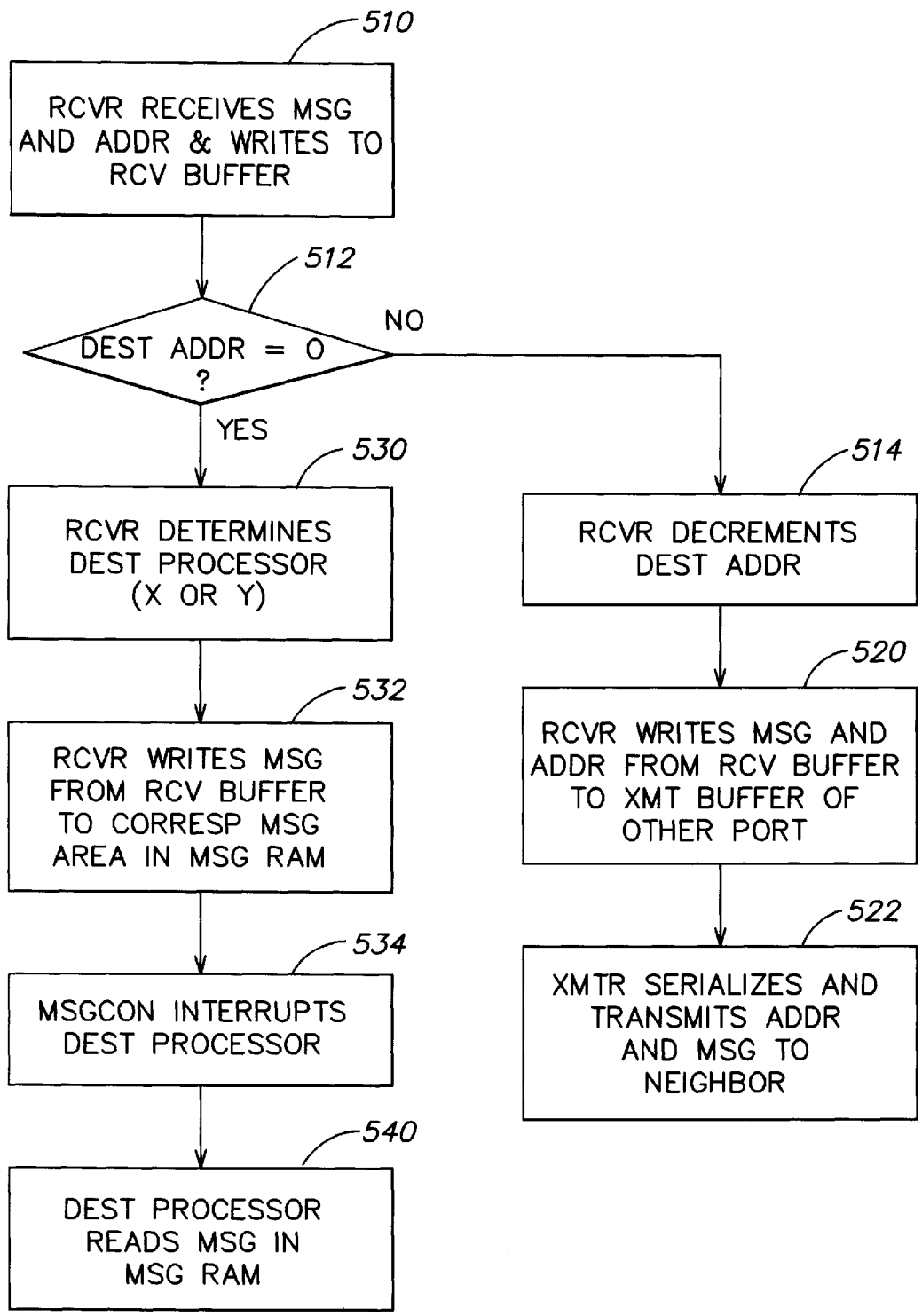
FIG. 7 is a flow chart that illustrates an example of a routine for receiving messages in accordance with the invention.

A flow chart of an example of a process for receiving messages in accordance with the invention is shown in FIG. 7. In step 510, the receiver in transmit/receive circuit 254 receives a serial message and a destination address and writes the message and the address to an available receive buffer. In the example described above, director 210 receives a message through port 172 from director 212. The message and the destination address are written, for example, into receive buffer 294. In step 512, the receiver examines the received destination address. If the destination address is determined in step 512 to be nonzero, the message is not addressed to that director and must be transmitted to the next director in the network. In step 514, the receiver decrements the received destination address by one. In step 520, the receiver writes the message and the decremented address from the receive buffer to the transmit buffer in the other port of the message interface. In the above example, the message and the decremented address are written from receive buffer 294 in port 172 to transmit buffer 280 in port 170. In step 522, the transmitter serializes and transmits the decremented address and the message to the next director through the other port. In the example given above, the message is transmitted by director 210 to director 220 through port 170.

If the received destination address is determined in step 512 to be zero, the received message is addressed to that director. In step 530, the receiver determines the destination processor 120 or 122. The destination processor in the director may, for example, be identified by a bit in the header of the received data packet. In step 532, the receiver writes the received message from the receive buffer to the corresponding area in the message memory 250. Assuming that the message has been received in receive buffer 294 and is addressed to the X processor 120 in the director, the message is written from receive buffer 294 to message area 310b of X area 310. The message is written to message memory via message controller 252. In particular, the transmit/receive circuit 254 asserts the chip enable signal 364 and places the message on multiplexed bus 360. The message is written to message memory 250 via address bus 350 and data bus 352. The message controller 252 interrupts the destination processor in step 534 by asserting the X processor message interrupt line 342. In step 540, the destination processor (X processor 120) reads the message in the message memory 250 via shared address bus 160 and shared data bus 162.

The message interface 150, in addition to handling high speed message transfer between directors, may handle message transfer between processors on the same director. Thus, for example, X processor 120 may transmit a message to Y processor 122 on the same director. In a manner similar to that described above, X processor 120 writes the message in message area 310b of X area 310 and writes the destination ID of Y processor 122 in the destination area. When the transmitter examines the destination ID, it recognizes that transmission of the message to another director is not required. Instead, the message is written from X area 310 to Y area 312 of message memory 250, and a message interrupt is sent to Y processor 122. Y processor 122 then reads the message in Y area 312. Ports 170 and 172 are not used for transferring messages between processors on the same director.

The message interface 150 preferably includes error checking functions. The message controller 252 may check for address parity errors on shared address bus 160 during reads and writes and for data parity errors on shared data bus 162 during writes to message memory 250 and to message controller registers from the X and Y processors. These errors result in an address parity error signal 348 or a data parity error signal 346 to the appropriate processor. The message controller 252 may generate parity for processor reads from its registers and checks parity for processor reads from message memory 250, but these errors do not cause an interrupt. A four-bit register in the message controller 252 may store which byte lane had errors on a CPU read. Another four-bit register may store the same information for processors writes, with a bit indicating that the access was to message memory 250 or a message controller register. Another register stores which address bytes had an address parity error. The multiplexed bus 360 has no parity. The message controller 252 generates parity on ARM processor writes to message memory 250 and checks parity on reads. If an error is detected, byte lane information is stored, and a message error signal 344 is sent to both processors.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A computer storage system comprising:

an array of storage devices;

a system cache memory;

one or more back end directors for controlling data transfer between said array and said system cache memory; and one or more front end directors for controlling data transfer between said system cache memory and a host computer, at least two of said directors comprising a processor for controlling data transfer and a message interface for controlling high speed message transfer between the processors in said at least two directors.

2. A computer storage system as defined in claim 1 wherein said message interface in each of said at least two directors comprises first and second ports for serial data transfer to others of said at least two directors.

3. A computer storage system as defined in claim 2 wherein each of said first and second ports is connected to another of said at least two directors and wherein said at least two directors are connected in a closed-loop network configuration.

4. A computer storage system as defined in claim 2 wherein the message interface in each of said at least two directors utilizes an SSA interface protocol.

5. A computer storage system as defined in claim 1 wherein the message interface in each of said at least two directors comprises a message memory for storing incoming messages and outgoing messages.

6. A computer storage system as defined in claim 1 wherein the message interface in each of said at least two directors transmits and receives messages on a high speed serial data link.

7. A computer storage system as defined in claim 1 wherein the message interface in each of said at least two directors comprises a transmit/receive circuit for transferring messages to and from others of said at least two directors, a message memory for storing outgoing messages and incoming messages and a message controller for controlling transfer of messages between said processor and said message memory and between said message memory and said transmit/receive circuit.

8. A computer storage system as defined in claim 7 wherein each of said at least two directors comprises a first processor and a second processor that share said message interface and wherein an area of said message memory is assigned to each of said first and second processors.

9. A computer storage system as defined in claim 7 wherein said processor includes means for writing an outgoing message in said message memory and said message controller includes means for notifying said transmit/receive circuit that said outgoing message has been written in said message memory.

10. A computer storage system as defined in claim 7 wherein said message controller includes means for writing an incoming message in said message memory and means for notifying said processor that said incoming message has been written in said message memory.

11. In a computer storage system comprising an array of storage devices, a system cache memory, one or more back end directors for controlling data transfer between said array and said system cache memory, and one or more front end directors for controlling data transfer between said system cache memory and a host computer, a method for transferring messages between said directors, comprising the step of:

transferring messages from a transmitting director to a receiving director on a high speed serial data link.

12. A method as defined in claim 11 wherein the step of transferring messages comprises the steps of writing an outgoing message in a message memory and notifying a transmitter that the outgoing message has been written in the message memory.

13. A method as defined in claim 11 wherein the step of transferring messages comprises writing an incoming message in a message memory and notifying a receiving processor that the incoming message has been written in the message memory.

14. A disk array system comprising:

an array of disk drives;

a system cache memory;

one or more back end directors for controlling data transfer between said array of disk drives and said system cache memory; and one or more front end directors for controlling data transfer between said system cache memory and a host computer, each of said directors comprising a processor and a message interface for controlling high speed message transfer between the processors in said directors, the message interface in each of said directors comprising a transmit/receive circuit for transferring messages to and from others of said directors, a message memory for storing outgoing messages and incoming messages and a message controller for controlling the transfer of messages between said processor and said message memory and between said message memory and said transmit/receive circuit.

15. A disk array system as defined in claim 14 wherein the message interface in each of said directors further comprises first and second ports for serial data transfer to others of said directors and wherein said directors are connected in a closed-loop configuration.

16. A disk array system as defined in claim 14 wherein each of said directors comprises a first processor and a second processor that share said message interface and wherein an area of said message memory is assigned to each of said first and second processors.

17. A disk array system as defined in claim 14 wherein said processor includes means for writing an outgoing message in said message memory and means for notifying said transmit/receive circuit that said outgoing message has been written in said message memory.

18. A disk array system as defined in claim 14 wherein said message controller includes means for writing an incoming message in said message memory and means for notifying said processor that said incoming message has been written in said message memory.

\* \* \* \* \*